June 28, 1955 — O. B. SUMMERS — 2,711,914
MULTI-DISK FLOATING CONTACT MECHANICAL SHAFT SEAL
Filed Sept. 22, 1950
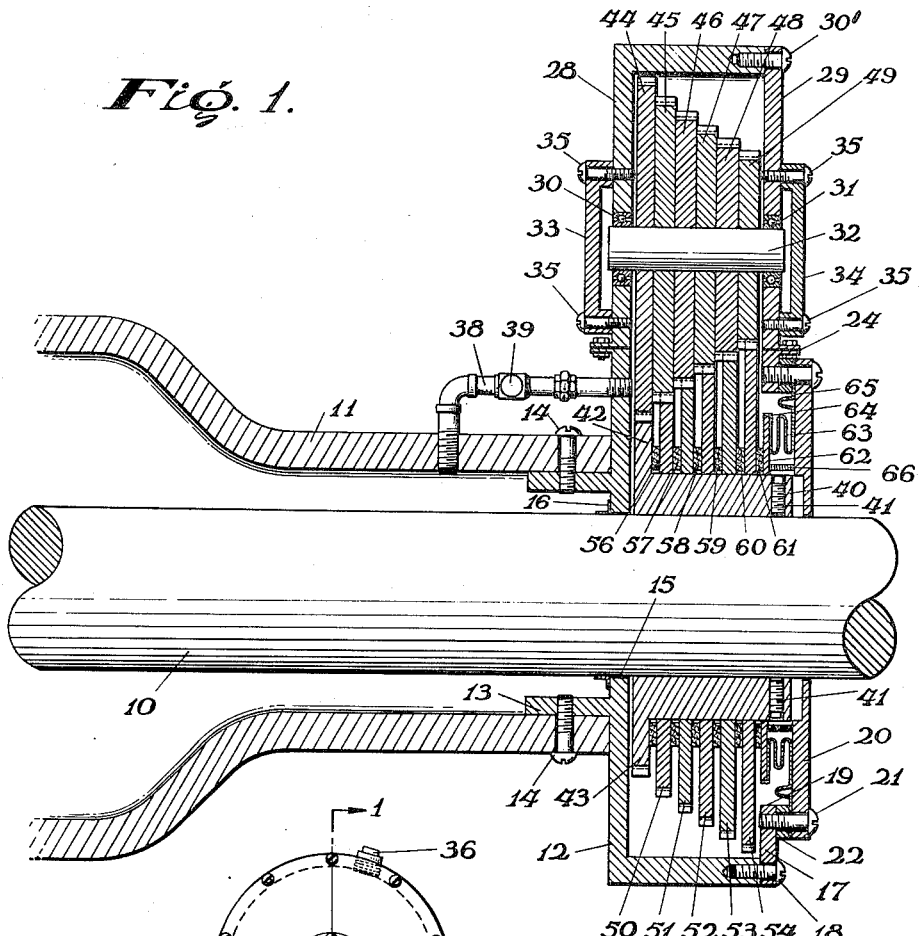
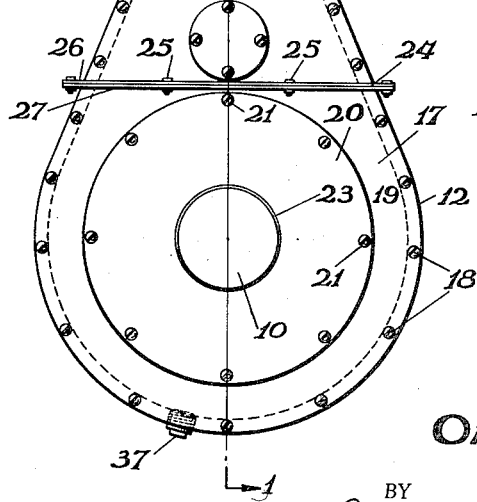
INVENTOR
*Orran B. Summers*
BY
*Cameron, Kerkam & Sutton*
ATTORNEYS

United States Patent Office 2,711,914
Patented June 28, 1955

2,711,914

MULTI-DISK FLOATING CONTACT MECHANICAL SHAFT SEAL

Orran B. Summers, Los Alamos, N. Mex., assignor of eighty per cent to International Industries, Inc. (N. S. L.), Santa Fe, N. Mex.

Application September 22, 1950, Serial No. 186,274

4 Claims. (Cl. 286—11)

This invention relates to multi-disk floating contact mechanical shaft seals and more particularly to such seals in which any desired contact speed may be obtained for any given shaft speed.

Heretofore shaft seals have been proposed in which a stationary contact member is engaged by a moving contact member to form the necessary seal and the moving contact member rotates with the shaft. With this arrangement the moving contact member has an extremely high contact speed with respect to the stationary contact member at high shaft speeds with resulting wear, vibration, and fire hazard when inflammable fluids are being pumped.

By the present invention I provide a multi-disk floating contact mechanical shaft seal in which driven sealing disks and intermediate floating sealing disks are employed with the driven sealing disks driven at different and at progressively decreasing speeds as the contact member is approached so that the speed of the moving sealing and contact member may be adjusted to any desired speed. Since the speed of the moving sealing and contact member can be reduced in the present invention it results that wear is reduced to a minimum, vibration is eliminated, and fire hazards are overcome.

It is accordingly an object of the present invention to provide a novel shaft seal having multiple driven sealing disks and intermediate floating sealing disks with the driven disks having different and progressively decreasing speeds as the contact member is approached.

Another object is to provide such a shaft seal in which the speed of the movable sealing and contact member can be reduced to any desired speed for any shaft speed to eliminate wear, vibration and fire hazard.

Another object is to provide such a shaft seal which may be used with all types of liquids, under vacuum conditions, at all pressures, at all temperatures and on any type of shaft or pump without major modification of the installation.

Another object is to provide such a shaft seal in which there is no contact rigidity and in which the stationary sealing and contact member is resiliently held against the movable sealing and contact member.

Another object is to provide such a shaft seal in which a flexible metallic diaphragm is used for sealing the stationary sealing and contact member with respect to the seal housing and in which all elements of the shaft seal may be constructed of metals to withstand high operation temperatures.

Another object is to provide such a shaft seal which may be adapted to fit a variety of shaft sizes without major modification of the seal assembly.

Another object is to provide such a shaft seal which may be readily installed externally of the shaft housing to provide efficient shaft sealing without major modification of the shaft housing.

Another and further object of the present invention is to provide such a shaft seal which is efficient in operation, relatively cheap to manufacture, easy to install and which is of long life in operation without excessive wear or mechanical failure.

The shaft seal of the present invention is capable of various mechanical embodiments one of which is shown in the accompanying drawing and is described hereinafter for purposes of illustration. This illustrative embodiment of my invention should in no way be construed as defining or limiting the same and reference should be had to the appended claims to determine the scope of this invention.

In the accompanying drawing, in which like reference characters indicate like parts, Fig. 1 is a cross-sectional elevation of one embodiment of the shaft seal of the present invention showing one way of applying the same to a shaft and its associated housing and showing the relationship of the several parts thereof; and Fig. 2 is a view from the right of the embodiment of Fig. 1 showing the arrangement of the several parts of the housing for the shaft seal.

Referring now more particularly to Fig. 1, a part of a shaft to be sealed is indicated at 10 and shaft 10 is provided with any suitable housing 11. Any suitable shaft seal housing 12 is provided with an annular flange 13 which fits snugly within housing 11 and is secured in place by any suitable means such as bolts 14. Seal housing 12 is bored at 15 to admit shaft 10 therethrough and a scavenger seal 16 may encircle shaft 10 at opening 15 to prevent solids or foreign matter from entering the shaft sealing assembly. Housing 12 is closed by a face plate 17 suitably secured thereto as by bolts 18 and face plate 17 may be circularly cut away at 19 to provide admission to the shaft sealing assembly. Opening 19 may be closed by plate 20 and may be spaced therefrom by annular riser 22, plate 20 and riser 22 being secured to face plate 17 by suitable means such as bolts 21. Plate 20 is circularly cut away at 23 to allow shaft 10 to pass therethrough.

A second seal housing assembly is secured to the seal housing just described along the joint 24 as by bolts 25, bolts 25 passing through suitable flanges 26 and 27 formed on each of the housings respectively. The upper housing comprises a hollow housing member 28 to which is suitably secured a face plate 29 as by bolts 30'. Housing 28 and face plate 29 support alined bearings 30 and 31 respectively which support a suitable shaft 32 for rotation therein. Caps 33 and 34 cover these bearings and the ends of shaft 32 and are secured to housing member 28 and to face plate 29 respectively by suitable means such as bolts 35.

Lubricant admission openings and drains are provided in the seal housing and closure plugs for the same are shown at 36 and 37 respectively (Fig. 2).

Fluid pressure in the seal housing is equalized with the fluid pressure in shaft housing 11 by a suitable conduit 38 interconnecting the same. Conduit 38 is provided with a suitable check valve 39 to prevent bleeding of fluid from the seal housing to the shaft housing.

It is to be understood that all of the joints between the shaft housing and the seal housing and all of the joints between the several component parts of the seal housings are fluid tight and that suitable gaskets or other means may be provided to insure that no fluid is lost through these joints.

A suitable collar 40 is mounted on shaft 10 and forms a tight fit therewith and is secured thereto by suitable means such as set bolts 41. Collar 40 is provided at one end with an annular upstanding flange 42 which is provided around its circumference with suitable gear teeth 43. A plurality of gears 44, 45, 46, 47, 48 and 49 of progressively decreasing diameter are fixed on shaft 32 for rotation therewith and the gear of largest diameter, gear 44, meshes with the gear teeth 43 of annular flange 42. Thus when shaft 10 is rotated collar 40 rotates with it and annular flange 42 rotates gear 44 which in turn rotates shaft 32 and rotates gears 45, 46, 47, 48 and 49. A plurality of driven sealing disks 50, 51, 52, 53, and 54 of progressively increasing diameter are mounted on collar 40. The peripheries of disks 50, 51, 52, 53 and 54 are provided with suitable gear teeth to mesh with the gear teeth of gears 45, 46, 47, 48 and 49 respectively. Disks 50, 51, 52, 53 and 54 are of less thickness than the corresponding gears 45, 46, 47, 48 and 49 and are free to slide axially along collar 40.

A plurality of floating annular sealing disks 56, 57, 58, 59, 60 and 61 are mounted on collar 40 and are free to move axially with respect thereto. Disk 56 is in engagement with annular flange 42 and the adjacent driven sealing disk 50, disks 51, 52, 53 and 54 are separated by floating disks 57, 58, 59 and 60 respectively, disks 61 being the moving contact disk. The speed of each of the floating sealing disks 56–61 is theoretically approximately the average speed of the two adjacent driven disks which contact it.

A fixed contact member 62 is mounted on collar 40 for axial movement with respect thereto and is preferably annular in shape. An expansible and contractible resilient corrugated seal or bellows 63 is secured around the circumference of disk 62 and 64 and is provided with an annular flange 65 which is secured beneath plate 20. Bellows 63 forms a fluid seal for contact disk 62 and resiliently urges the same into contact with disk 61, a suitable spring or other resilient element 66 being provided to assist bellows 63.

Assuming that shaft 10 is rotated at 3600 R. P. M. then the diameter of annular flange 42 and gear 44 should be such that shaft 32 is rotated at approximately 3000 R. P. M. With shaft 32 rotating at 3000 R. P. M. the diameter of gear 45 and of disk 50 should be such that disk 50 rotates at 3000 R. P. M.; the diameter of gear 46 and of disk 51 should be selected so that disk 51 rotates at 2400 R. P. M.; the diameter of gear 47 and disk 52 should be such that disk 52 rotates at 1800 R. P. M.; the diameter of gear 48 and of disk 53 should be such that disk 53 rotates at 1200 R. P. M.; and the diameter of gear 49 and of disk 54 should be such that disk 54 rotates at 600 R. P. M. Since the speed of rotation of each of the floating sealing disks 56–61 is approximately the average of the speeds of rotation of the adjacent pair of driven sealing disks 50–54 it follows that the speed of rotation of the moving contact disk 61 will be approximately 300 R. P. M. Since disk 61 is in frictional engagement with stationary contact disk 62 the speed of disk 61 will be less than 300 R. P. M. and in the neighborhood of 270 R. P. M. Since disk 62 is resiliently urged into contact with disk 61 and since disk 61 is moving at relatively low speeds excessive wear is eliminated, vibration is overcome, overheating is non-existent and any wear of the several driven sealing disks and the floating sealing disks is automatically compensated by the axial movement thereof along collar 40 by reason of the force exerted by bellows 63 and spring 66.

It will be obvious from the above description of the present invention that any suitable speed can be obtained at the moving contact disk by suitable choice of the number of and/or the ratios of the several gears and the several driven disks and, further, that the speeds of the driven disks can be varied and adjusted as required to reduce to a minimum any wear on the intermediate floating disks.

It will now be apparent to those skilled in the art that by the present invention I have provided a novel multi-disk floating contact mechanical shaft seal which in every way satisfies the several objects discussed above.

Changes in or modifications to the above described illustrative embodiment of my invention may now be suggested to those skilled in the art without departing from my inventive concept and reference should be had to the appended claims to determine the scope of my invention.

What is claimed is:

1. In a shaft seal including a shaft, a housing for the shaft and a seal housing surrounding the shaft and secured to the shaft housing, a collar mounted on the shaft within the seal housing, a gear mounted on the collar, a stub shaft journaled in the wall of the seal housing, a plurality of gears of progressively decreasing diameter mounted on said stub shaft one of said gears engaging said gear on said collar, a plurality of driven sealing disks provided with gear teeth on their peripheries slidably mounted on said collar and each engaging a corresponding one of said gears and driven at progressively decreasing speeds, a floating sealing disk slidably mounted on said collar between each pair of said driven sealing disks and rotating at approximately the average speed of rotation of the pair of adjacent driven disks, a contact member surrounding said collar, a floating sealing disk slidably mounted on said collar between said contact member and the adjacent driven disk and means associated with the seal housing for sealing said contact member and for resiliently urging said contact member into engagement with the adjacent floating sealing disk.

2. In a shaft seal including a shaft, a housing for the shaft and a seal housing surrounding the shaft, a gear driven by the shaft in the seal housing, a plurality of connected gears of progressively decreasing diameter journaled in the seal housing and rotated by said shaft driven gear, a plurality of driven sealing disks slidable axially along the shaft each one of which engages one of said connected gears, said driven disks rotating at progressively decreasing speeds, a floating sealing disk movable axially along the shaft and mounted between each pair of said driven sealing disks and rotating at approximately the average speed of the adjacent pair of driven disks, a contact member surrounding the shaft, means resiliently sealing the seal housing and said contact member, a floating sealing disk movable axially on said shaft between said contact member and the adjacent one of said driven disks.

3. In a shaft seal including a shaft, a shaft housing and a seal housing surrounding the shaft, a plurality of driven sealing disks slidable axially along the shaft, means driven by said shaft for driving said driven disks at different and at progressively decreasing speeds, a floating sealing disk mounted between each pair of said driven disks and rotating at approximately the average speed of the adjacent pair of driven disks, and a contact member surrounding the shaft resiliently sealed to the seal housing, and a floating sealing disk movable axially on the shaft between said contact member and the driven disk driven at the lowest speed.

4. In a shaft seal including a shaft, and a shaft and seal housing, a plurality of driven sealing disks movable axially along the shaft in the seal housing, a contact member surrounding the shaft, means driven by the shaft for driving said driven disks at different and at decreasing speeds as said contact member is approached, a floating sealing disk between each pair of said driven disks and between said contact member and the adjacent driven disk and rotating at approximately the average speed of the adjacent pair of driven disks, and means for resiliently urging said contact member into engagement with the adjacent floating disk and for sealing said contact member to the seal housing.

References Cited in the file of this patent

UNITED STATES PATENTS

| | | |
|---|---|---|
| 849,576 | Schulz | Apr. 9, 1907 |
| 2,042,691 | Williams | June 2, 1936 |
| 2,133,524 | Bears | Oct. 18, 1938 |
| 2,148,093 | Wheeler | Feb. 21, 1939 |
| 2,436,514 | Jennings | Feb. 24, 1948 |